(12) United States Patent
Fledersbacher et al.

(10) Patent No.: US 7,428,815 B2
(45) Date of Patent: Sep. 30, 2008

(54) METHOD OF OPERATING A COMPRESSOR NEAR THE COMPRESSOR PUMPING LIMIT AND COMPRESSOR

(75) Inventors: Peter Fledersbacher, Stuttgart (DE);
Gernot Hertweck, Fellbach (DE);
Steffen Schiedt, Waiblingen (DE);
Guido Vent, Backnang-Steinbach (DE);
Jürgen Willand, Stuttgart (DE)

(73) Assignee: Daimler AG, Stuttgart (DE)

( * ) Notice: Subject to any disclaimer, the term of this patent is extended or adjusted under 35 U.S.C. 154(b) by 578 days.

(21) Appl. No.: 11/110,965

(22) Filed: Apr. 20, 2005

(65) Prior Publication Data

US 2005/0265822 A1 Dec. 1, 2005

Related U.S. Application Data

(63) Continuation-in-part of application No. PCT/EP03/11300, filed on Oct. 13, 2002.

(30) Foreign Application Priority Data

Oct. 24, 2002 (DE) .............................. 102 49 471

(51) Int. Cl.
*F02B 33/44* (2006.01)
(52) U.S. Cl. ...................................... 60/605.1; 417/46

(58) Field of Classification Search .................. 417/46, 417/47, 53, 407; 60/605.1, 605.2
See application file for complete search history.

(56) References Cited

U.S. PATENT DOCUMENTS

| 3,901,620 | A | * | 8/1975 | Boyce ........................... 415/1 |
| 4,205,941 | A | | 6/1980 | Fradin |
| 4,603,552 | A | * | 8/1986 | Kido .......................... 60/605.1 |
| 4,719,887 | A | * | 1/1988 | Schmid et al. ............... 123/383 |
| 6,523,345 | B2 | * | 2/2003 | Scherngell et al. ............ 60/602 |
| 6,996,896 | B2 | * | 2/2006 | Choi et al. ..................... 29/825 |

FOREIGN PATENT DOCUMENTS

| DE | 24 48 841 | 4/1975 |
| DE | 43 16 202 | 4/1998 |
| EP | 0 761 981 | 9/1996 |
| EP | 0 930 423 | 7/1999 |

* cited by examiner

Primary Examiner—Hoang M Nguyen
(74) Attorney, Agent, or Firm—Klaus J. Bach

(57) ABSTRACT

In a method of operating a compressor near the compressor pumping limit wherein the compressor includes a control arrangement for adjusting the momentary operating state of the compressor, the flow velocity of a mass flow through the compressor in the boundary layer along the wall of the flow passage is determined for detecting operation of the compressor close to the pumping limit from a reversal of the direction of the mass flow vector in the boundary layer and the control arrangement is actuated so as to prevent the compressor from transgressing the pumping limit.

9 Claims, 3 Drawing Sheets

METHOD OF OPERATING A COMPRESSOR NEAR THE COMPRESSOR PUMPING LIMIT AND COMPRESSOR

This is a Continuation-In-Part Application of International application PCT/EP03/11300 filed Oct. 13, 2002 and claiming priority of German application 102 49 471.1 filed Oct. 24, 2002.

BACKGROUND OF THE INVENTION

The invention resides in a method for operating a compressor near the compressor pumping limit which includes a control arrangement for adjusting the momentary operating point of the compressor wherein at least one value of a variable parameter of the compressor is measured, compared with a desired value and, upon occurrence of an excessive deviation, the control arrangement is activated so as to reduce the deviation.

DE 43 16 202 A1 discloses a method for the surveillance of the pumping limit of a turbocharger. The operating range of compressors is limited for high mass flows and, at the same time, high loads by the pumping limit whereby the actually usable compressor performance field width is limited particularly with respect to the pumping limit, from which a minimum distance must be maintained in order to avoid an unacceptably high loading of the compressor wheel.

In order to prevent exceeding the pump limit into the unacceptable range, in accordance with DE 43 16 202 A1, a control arrangement is provided wherein the pressures and the volume flows through the compressor are measured, compared in a control unit with corresponding desirable values and, with an unacceptable deviation of the actual values from the desired values, a guide structure arranged upstream or downstream of the compressor wheel is so adjusted that a desirable distance from the pumping limit is maintained. In this connection, it is however a problem that the desired values which are employed for a comparison with the measured values must be determined in advance on the basis of a reference compressor which limits a dynamic adaptation to conditions changing during the operation, for example as a result of soiling, wear or heat influences or makes it even impossible.

It is the object of the present invention to make a utilization of the operating range of a compressor within the compressor characteristic performance field possible to the largest extent while avoiding transgression of the pumping limit.

SUMMARY OF THE INVENTION

In a method of operating a compressor near the compressor pumping limit wherein the compressor includes a control arrangement for adjusting the momentary operating state of the compressor, the flow velocity of a mass flow through the compressor in the boundary layer along the wall of the flow passage is determined for detecting operation of the compressor close to the pumping limit from a reversal of the direction of the mass flow vector in the boundary layer and the control arrangement is actuated so as to prevent the compressor from transgressing the pumping limit.

The boundary layer speed in the flow channel in which the compressor is arranged provides a reliable indication whether a sufficiently large distance from the pumping limit is maintained or, respectively, the compressor operation approaches the pumping limit. When the pumping limit is approached, the velocity profile over the flow cross-section is changed in such a way, that, ahead of the start of the actual pumping procedure, a velocity reversal occurs in the boundary layer which reversal can be measured or, respectively, determined and which can be taken as an indication that the compressor is operated in close proximity to the pumping limit. When such a velocity reversal in the boundary layer is determined the operating mechanism for controlling the actual operating point of the compressor is actuated so as to achieve a stabilization of the compressor operation and to avoid transgression of the pumping limit into instable operating range of the compressor.

This kind of control has the advantage that, even with changing conditions, for example, with increasing soiling of an inlet air filter, operation at higher elevations, a pumping limit change over the operating period, manufacturing tolerances in the construction and similar conditions, the pumping limit can be reliably detected. There is no need for determining and recording reference values. This provides for a dynamic operation of the compressor even with changing conditions and optimal utilization of the available operating range.

As normal values which are used for comparison with the measured velocity values, velocity threshold values could be defined, wherein a control action is initiated when such a velocity threshold value is reached. By way of these threshold values, the distance from the pumping limit is determined during compressor operation. Furthermore, depending on the level of the threshold values, different measures for controlling the compressor operation can be taken. It is for example possible to actuate, when a first threshold or limit value is reached, a variable compressor control vane structure which may be a guide vane arrangement disposed upstream of the compressor wheel or an adjustable diffuser arranged downstream of the compressor wheel. By a second limit value whose absolute value is particularly higher than that of the first limit value, a variable turbine vane structure can be controlled if the compressor is part of a turbocharger and driven by a turbine. In this embodiment, the compressor is preferably part of an exhaust gas turbocharger of an internal combustion engine By the use of a third limit value for the flow velocity, whose absolute value is particularly higher than that of the second limit value, finally the fuel amount injected into the cylinders of the internal combustion engine can be controlled.

However, basically, it is sufficient to control, via the control unit, at least one measure which stabilizes the pumping limit as soon as the direction of the flow speed in the boundary layer is reversed independently of the absolute value of the flow velocity.

The boundary layer flow velocity is determined advantageously in the compressor wheel entrance area, particularly at the outer circumference of the compressor wheel, and/or in the compressor wheel exit area, particularly in the downstream diffuser. In these areas, the chances of a flow stall upon reaching the pumping limit are the greatest so that the detection of a flow reversal in the boundary layer in these areas offers the possibility to recognize the danger of pumping early and to initiate stabilizing actions.

A compressor which is suitable for performing the method according to the invention includes a control arrangement for controlling the compressor operating point, a measuring arrangement for determining at least one variable compressor characteristic value or parameter and a control unit in which the compressor characteristic value is compared with a desired value and by way of which the control arrangement is operated. By way of the measuring arrangement the flow speed of the mass flow in the boundary layer of the compressor wall adjacent the compressor wheel is determined. If the flow vector of the boundary flow speed reverses, a control signal for actuating the control arrangement is generated by which the operation of the compressor in the area near the pumping limit can be stabilized and an undesirable transgression of the compressor into an instable operating range can be avoided.

The measuring arrangement expediently comprises a sensor which is arranged adjacent the wall, particularly at a small distance from the wall. The sensor may for example be a so-called hot film sensor whose measurement principle is based on a heated body from which heat is removed by the flow medium flowing over the body.

Further advantages and expedient embodiments of the invention will become apparent from the following description thereof on the basis of the accompanying drawings.

DESCRIPTION OF A PARTICULAR EMBODIMENT OF THE INVENTION

Figure 1:
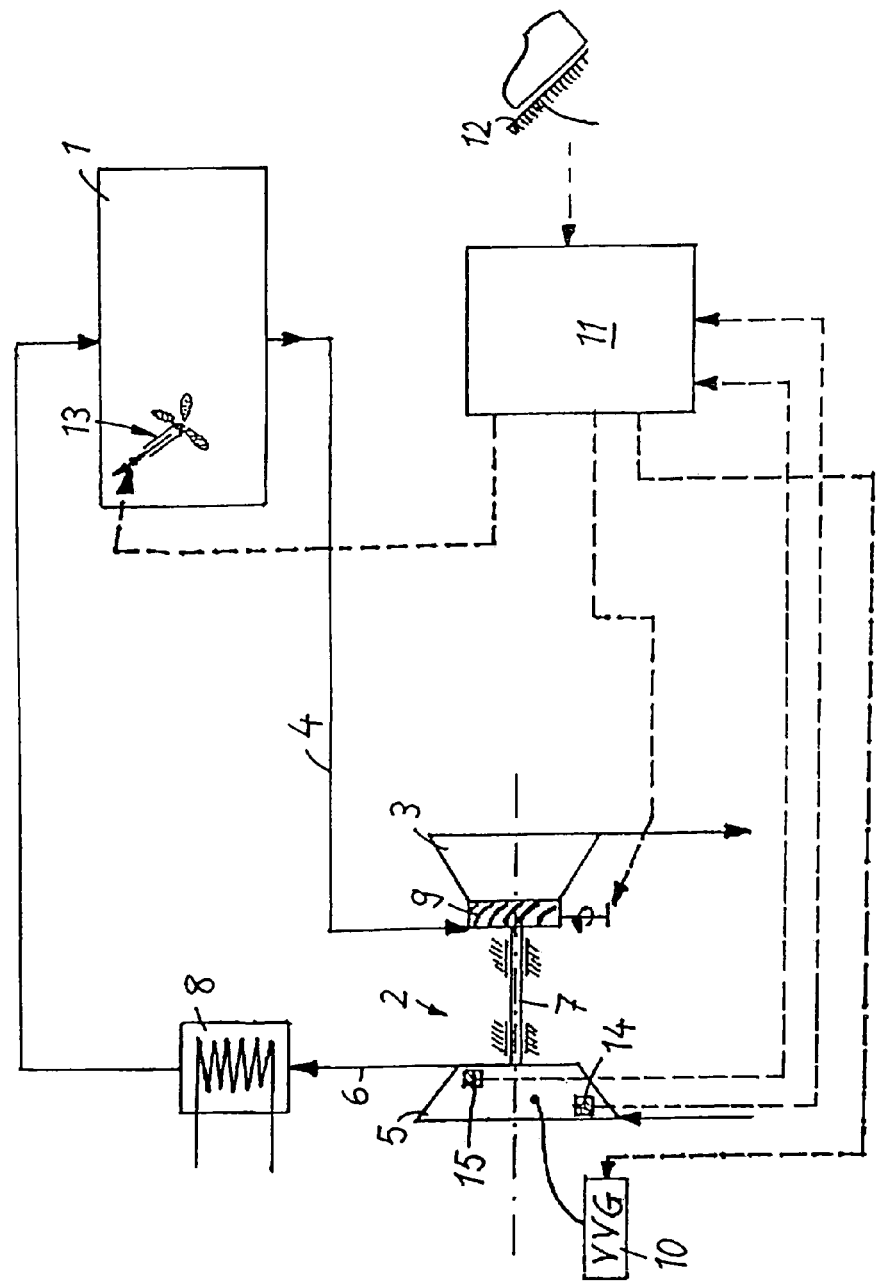
FIG. 1 shows schematically an internal combustion engine with an exhaust gas turbocharger whose exhaust gas turbine includes a variable turbine guide vane structure and whose compressor includes a variable compressor geometry (guide vane structure) wherein the compressor includes a measuring arrangement for detecting the flow velocity in a boundary layer near the wall of the flow passage for the mass flow through the compressor for an operation near the pumping limit.

FIG. 1 shows an internal combustion engine 1 with an exhaust gas turbocharger 2 which includes an exhaust gas turbine 3 arranged in the exhaust gas duct 4 of the engine and a compressor 5 arranged in the intake duct 6 of the engine. The compressor 5 is driven by the exhaust gas turbine 3 via a shaft 7 and compresses the combustion air to an increased pressure under which the combustion air is conducted downstream of the compressor 5 first through a charge air cooler 8 and then to the cylinders of the internal combustion engine 1. The exhaust gas turbine 3 is driven by the exhaust gases of the internal combustion engine which have an increased pressure and which, after passing through the exhaust turbine, are subjected to cleaning procedure and finally discharged to the environment.

The exhaust gas turbine includes a variable turbine geometry, that is, a variable flow guide vane structure, by way of which the effective turbine inlet cross-section can be adjusted between a minimal opening restrictive position and a maximum opening position. In this way, the operation of the internal combustion engine can be optimized during engine power operation and also during engine-braking operation. The variable turbine geometry 9 is provided for example in the form of a guide vane structure which can be moved axially into the turbine inlet flow passage or a guide vane structure mounted in the turbine inlet flow passage and having adjustable guide vanes.

The compressor 5 comprises a variable compressor or geometry (VVG) by way of which the effective compressor flow cross-section can be controlled, particularly in the compressor wheel inlet area and in the compressor wheel outlet area. In the compressor wheel inlet area, the variable compressor geometry 10 may comprise an adjustable inlet guide vane structure which is disposed in front of the compressor wheel. In the compressor outlet area, a vario-diffuser may be provided that is a diffuser with a variable flow cross-section.

All adjustable components of the internal combustion engine or, respectively, devices associated with the internal combustion engine are controlled by a control unit 11. The control unit 11 receives particularly position signals from an accelerator pedal 12, which is operated by a driver and controls the fuel injector 13, that is, the fuel injection into the cylinders of the internal combustion engine 1 and the momentary position of the variable turbine geometry 9 as well as the variable compressor geometry 10. All components or respectively accessory units of the internal combustion engine are controlled depending on the operating values of the internal combustion engine and the accessory units which are supplied to the control unit as information signals. The control unit generates from these information signals control signals which are supplied to the respective components and accessory units.

In order to be able to determine whether the compressor 5 is momentarily at an operating point close to its pumping limit the compressor 5 includes a measurement arrangement comprising sensors 14 and 15, by way of which the flow speed of the mass flow through the compressor can be determined. By way of the sensors 14 and 15 particularly the flow speed in the boundary layer of the mass flow along a wall of the flow channel in the compressor adjacent the compressor wheel can be determined. The first sensor 14 is arranged in the entrance area to the compressor wheel and the second sensor 15 is arranged in the exit area frame the compressor wheel. Consequently, the boundary layer flow velocity in the entrance area to the compressor wheel can be detected by the sensor 14 and the boundary layer flow velocity in the exit area of the compressor wheel can be detected by the sensor 15. The sensor signals of the sensors 14 and 15 are supplied as input or, respectively, information signals to the control unit 11 in which, in accordance with computation procedures recorded therein, control signals are generated from the sensor signals for controlling the variable turbine geometry 9, the variable compressor geometry 10 and/or the fuel injection via the fuel injectors 13. The variable turbine geometry 9; the variable compressor geometry 10 and the fuel injection are adjustable by respective operating devices such as slide actuator, rotary actuators or fuel injectors. By the adjustment of the variable turbine geometry, the variable compressor geometry and/or the fuel injection the momentary operating point of the compressor can be adjusted, particularly a sufficient distance from the pumping limit of the compressor can be maintained.

Figure 2:
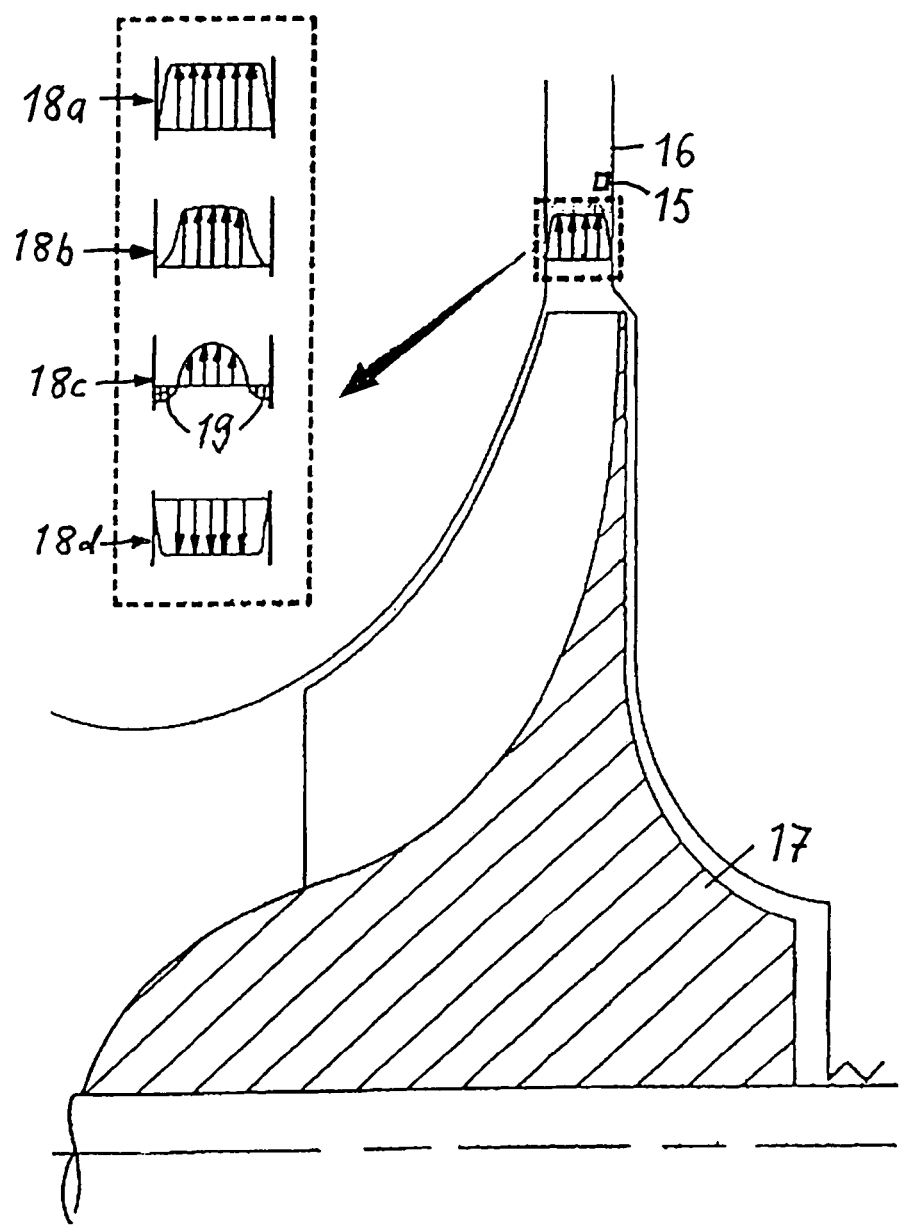
FIG. 2 shows, in an enlarged detailed view, a part of the compressor wheel in the exit area to the diffuser wherein the different flow speed profiles in the diffuser are separately shown.

From the sensor signals of the sensors 14 and 15, it can be determined whether the vector of the flow speed in the boundary layer has been reversed. Such a reversal of the flow speed in the boundary layer indicates that the compressor operates momentarily close to the pumping limit but still in the acceptable stable operating range. A further displacement of the operating point beyond the pumping limit into the unstable range for example by a reduction of the mass flow through the compressor however must be avoided which can be realized by appropriate adjustments of the variable compressor geometry, the variable turbine geometry and/or the fuel injection. By an adjustment of those settings, the operating point of the compressor in the area of the pumping limit can be stabilized. These conditions will be described below in greater detail on the basis of FIG. 2. In FIG. 2, the sensor 15 is arranged in the compressor wheel exit area—downstream of the compressor wheel 17—in a vario-diffuser 16 so that the compressed air from the compressor passes over the sensor 15. The diffuser 16 includes an adjustable cross-section geometry close to the wall for measuring the boundary layer flow speed. Four different flow profiles are shown which are established in the compressor wheel exit area at different operating points of the compressor.

A first flow profile 18a is characterized by large flow vectors in outflow direction which extend over the whole flow cross-section in the compressor wheel exit area. This operating point of the compressor corresponds to a compressor operation with high mass flows through the compressor and a high pressure ratio of compressor exit pressure to compressor inlet pressure.

In the flow profile 18b, the velocity vectors of the flow become smaller adjacent the boundary layer area. This corresponds to a compressor operation with a mass flow which is lower than that according to the flow profile 18a.

The flow profile 18c corresponds to a compressor operation very near the pumping limit in an operating range which is still, but barely, in the stable range: In the boundary layer area 19, the velocity vectors are reversed that is there is a flow reversal in the boundary layers which can be used as an indication of an impending reaching of the pumping limit. This flow reversal in the boundary layer can be determined by the sensor 15 in the area close to the wall and this information can be transmitted to the control unit for further processing so that stabilizing measures can be taken particularly adjustments to the variable turbine geometry, the variable compressor geometry and to the fuel injection to as to avoid further movement of the operating point of the compressor toward the unstable operating range.

The flow profile 18d corresponds to a compressor operation in the unstable unacceptable area after transgression of the pumping limit. All flow vectors of the compressor wheel exit cross-section have been reversed, that is, the compressor operates in pumping operation. This operation can be avoided by control and stabilizing measures upon detection of a flow reversal in the boundary layers.

Figure 3:
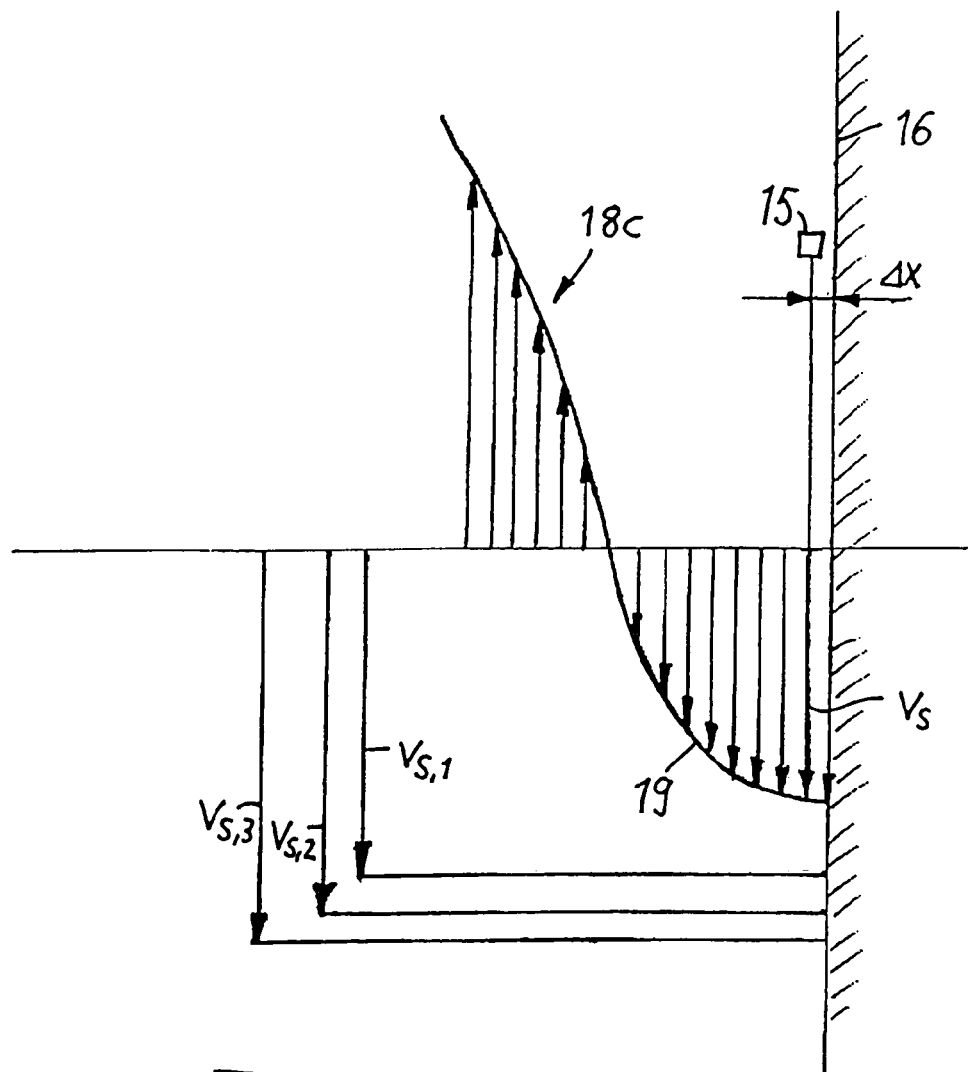
FIG. 3 shows a further enlarged speed profile in the entrance or the exit area of the compressor during operation near the pumping limit.

FIG. 3 shows, in an enlarged representation the vario-diffuser 16 in the compressor wheel exit area with the flow profile 18c during compressor operation near the pumping limit wherein the flow vectors are reversed in the boundary layer area 19. The sensor 15 is disposed at a distance $\Delta x$ from the wall of the vario-diffuser 16 and measures the velocity vector $v_s$. The distance $\Delta x$ of the sensor 15 from the adjacent wall is small, which has the advantage that a flow reversal in the boundary layer can be recognized early since a flow reversal occurs first in close proximity to the wall.

The velocity vectors $v_{s,1}$, $v_{s,2}$ and $v_{s,3}$ designate velocity limit values, which are stored in the control unit and which are employed as desired values for comparison with the measured actual value of the flow speed $v_s$ in the boundary layer. The velocity vectors $v_{s,1}$, $v_{s,2}$ and $v_{s,3}$ have different values and can be utilized for initiating different actions. It is for example possible to initiate first a control action in the variable compressor geometry when the measured velocity vector $v_s$ has reached the first lowest velocity limit value $v_{s,1}$. Upon reaching the next higher velocity limit value $v_{s,2}$ a control action can then be initiated for the variable turbine geometry and upon reaching the third, largest limit value $v_{s,3}$ a control action can be initiated for the fuel injection. All control actions are performed in such a way that the compressor operation is stabilized in the admissible operating range.

What is claimed is:

1. A method of operating a compressor (5) of an exhaust gas turbocharger of an internal combustion engine including an exhaust gas turbine with a variable turbine inlet geometry coupled to the compressor near the compressor pumping limit wherein the compressor includes a control arrangement for adjusting the momentary operating state of the compressor, the method comprising the steps of: measuring the flow velocity $v_3$ of a mass flow through the compressor (5) in the boundary layer along the wall of a flow passage through the compressor, determining an operation of the compressor near the pumping limit from a reversal of the direction of a mass flow vector in the boundary layer, and actuating the control arrangement for stabilizing compressor operation so as to prevent the compressor from transgressing the pumping limit, wherein, when the mass flow through the compressor reaches a first flow velocity threshold value ($v_{s,1}$), one of an actuating mechanism for adjusting a variable compressor geometry and an actuating mechanism for adjusting a variable turbine geometry is operated, when the mass flow through the compressor reaches a second flow velocity threshold value ($v_{s,2}$), the other of the actuating mechanism for adjusting a variable compressor geometry and the actuating mechanism for adjusting a variable turbine geometry is operated and, finally, when the mass flow through the compressor reaches a third flow velocity threshold value ($v_{s,3}$), an actuating mechanism for reducing the fuel amount injected into the cylinders of the internal combustion engine is operated.

2. A method of operating a compressor according to claim 1, wherein the flow velocity ($v_s$) is determined in the entrance area of the compressor.

3. A method of operating a compressor according to claim 1, wherein the flow velocity $v_s$ is determined in the exit area of the compressor wheel.

4. A method of operating a compressor according to claim 1, wherein the control arrangement is actuated so as to adjust the operating point of the compressor (5) depending on the flow velocity ($v_s$) measured.

5. A compressor comprising a compressor rotor disposed in a housing having compressor inlet and exit areas, a variable flow geometry arranged in at least one of the compressor inlet and exhaust areas, a control unit for controlling the compressor operation and a control arrangement for controlling the operation of the compressor (5), sensors (14, 15) for measuring at least one variable compressor performance value which is compared with a stored desired value, and means for generating a signal upon an excessive deviation of the measured value from the desired value for actuating the control arrangement when the control arrangement determines that the flow velocity ($v_s$) of the mass flow through the compressor (5) as determined in the boundary layer adjacent a wall of the compressor housing delimiting a flow channel through the compressor housing has been reversed, said compressor having a variable compressor outlet geometry and being part of a turbocharger including an exhaust gas turbine with a variable turbine inlet geometry, said control arrangement being effective to stabilize the compressive operation whereby, upon reaching a first flow velocity limit value ($v_{s,1}$), an actuating mechanism for adjusting a variable compressor geometry is operated, upon reaching a second flow velocity limit value ($v_{s,2}$), an actuating mechanism for adjusting a variable turbine geometry is operated and, finally, upon reaching a third flow velocity limit value ($v_{s,3}$), an actuating mechanism for reducing the fuel amount injected into the cylinders of the internal combustion engine is operated.

6. A compressor according to claim 5, wherein the measuring arrangement comprises a hot air film meter as a sensor (14, 15).

7. A compressor according to claim 5, wherein the sensor (14) of the measuring arrangement is arranged in the entrance area to the compressor.

8. A compressor according to claim 5, wherein the sensor (15) of the measuring arrangement is arranged in the compressor exit area.

9. A compressor according to claim 5, wherein the compressor includes a variable compressor geometry which is adjustable by the control arrangement.

* * * * *